United States Patent
Huang et al.

(10) Patent No.: US 9,713,047 B2
(45) Date of Patent: Jul. 18, 2017

(54) METHOD AND APPARATUS FOR OPTIMIZING UE IDENTIFICATION

(71) Applicant: Telefonaktiebolaget LM Ericsson (publ), Stockholm (SE)

(72) Inventors: Min Huang, Beijing (CN); Yipeng Zhang, Beijing (CN); Lei Xiao, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/035,714

(22) PCT Filed: Nov. 27, 2013

(86) PCT No.: PCT/CN2013/087917
§ 371 (c)(1),
(2) Date: May 10, 2016

(87) PCT Pub. No.: WO2015/077933
PCT Pub. Date: Jun. 4, 2015

(65) Prior Publication Data
US 2016/0286442 A1  Sep. 29, 2016

(51) Int. Cl.
*H04W 36/00* (2009.01)
*H04W 36/16* (2009.01)
*H04W 36/32* (2009.01)

(52) U.S. Cl.
CPC ....... *H04W 36/0083* (2013.01); *H04W 36/16* (2013.01); *H04W 36/32* (2013.01)

(58) Field of Classification Search
None
See application file for complete search history.

(56) References Cited

U.S. PATENT DOCUMENTS

| 2013/0273919 A1* | 10/2013 | Sashihara | H04W 36/30 455/436 |
| 2015/0023319 A1* | 1/2015 | Park | H04W 36/0055 370/331 |
| 2015/0141021 A1* | 5/2015 | Kapoulas | H04W 36/32 455/441 |

FOREIGN PATENT DOCUMENTS

| CN | 1889785 A | 1/2007 |
| CN | 1984444 A | 6/2007 |

(Continued)

OTHER PUBLICATIONS

Author Unknown, "3rd Generation Partnership Project; Technical Specification Group Radio Access Network; Evolved Universal Terrestrial Radio Access Network (E-UTRAN); Self-configuring and self-optimizing network (SON) use cases and solutions (Release 9)," Technical Report 36.902, Version 9.3.1, Section 4.5, 3GPP Organizational Partners, Mar. 2011, 5 pages.

(Continued)

*Primary Examiner* — Erika Washington
(74) *Attorney, Agent, or Firm* — Withrow & Terranova, PLLC

(57) ABSTRACT

A method and an apparatus in a base station of a cellular radio system for identifying whether user equipment, UE, is in a first UE group or a second UE group. A speed of any UE in the first UE group is higher than a speed of any UE in the second UE group. The method comprises: detecting one or more handover failure events of at least one of the first UE group and the second UE group; determining whether there is any UE misidentified in the first or second UE group based on the one or more handover failure events; and in response to determining that there is a UE misidentified in the first or second UE group, adjusting at least one of the criteria of identifying a UE as in the first UE group and the criteria of identifying a UE as in the second UE group.

19 Claims, 9 Drawing Sheets

(56) References Cited

FOREIGN PATENT DOCUMENTS

| CN | 102821384 A | 12/2012 |
|----|-------------|---------|
| CN | 102821410 A | 12/2012 |
| WO | 2013097063 A1 | 7/2013 |

OTHER PUBLICATIONS

Author Unknown, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," Technical Specification 36.300, Version 11.7.0, Section 22.4.2, 3GPP Organizational Partners, Sep. 2013, 4 pages.

Author Unknown, "3rd Generation Partnership Project; Technical Specification Group Radio Access Network; Evolved Universal Terrestrial Radio Access (E-UTRA); Radio Resource Control (RRC); Protocol specification (Release 11)," Technical Specification 36.331, Version 11.5.0, 3GPP Organizational Partners, Sep. 2013, 347 pages.

International Search Report and Written Opinion for International Patent Application No. PCT/CN2013/087917, mailed Sep. 15, 2014, 8 pages.

\* cited by examiner

METHOD AND APPARATUS FOR OPTIMIZING UE IDENTIFICATION

This application is a 35 U.S.C. §371 national phase filing of International Application No. PCT/CN2013/087917, filed Nov. 27, 2013, the disclosure of which is incorporated herein by reference in its entirety.

TECHNICAL FIELD

Embodiments herein generally relate to communication systems, and more particularly to a method, an apparatus, a base station, and a computer readable storage medium for optimizing criteria of identifying a user equipment (UE).

BACKGROUND

This section introduces aspects that may facilitate a better understanding of the disclosure. Accordingly, the statements of this section are to be read in this light and are not to be understood as admissions about what is in the prior art or what is not in the prior art.

In cellular telecommunications, when a user equipment (UE) moves from a cell to another cell, handover should be performed in order to maintain the communications of the user equipment without interruption. The success rate of the handover is a key aspect in cellular system design.

FIG. 1 illustrates an example procedure for a UE to take handover between two cells in Long Term Evolution (LTE) systems. In FIG. 1, two base stations, e.g. enhanced NodeB (eNB) A and eNB B are shown for illustration. FIG. 1 also shows some cellular coverage areas, also called cells or sectors, served by eNB A and eNB B, respectively. For example, cell 1 and cell 2 are served by eNB A, and cell 3 and cell 4 are served by eNB B. A UE located in the overlapping region of cell 2 and cell 3 is shown to explain the handover procedure from cell 2 to cell 3.

In the exemplary scenario shown in FIG. 1, the UE moves slowly. For example, the UE is carried by a person walking in a pedestrian road.

Normally, according to the interaction with a UE, the handover procedure can mainly comprise three phases. During the first phase, as indicated by the signaling line 1, a measurement report is triggered and sent from the UE to a source eNB (e.g., eNB A in this example) which serves a source cell (e.g., cell 2 in this example). The measurement report may comprise information about signal quality of the source cell and a neighboring cell (e.g., cell 3). Then, the source eNB makes decision based on the measurement report and some other information to hand over the UE to the neighboring cell, i.e., the target cell, which is served by a target eNB (e.g., eNB B in this example). Some necessary information may be exchanged between the source eNB and the target eNB in order to prepare the handover.

During the second phase, as indicated by the signaling line 2, the source eNB sends a handover (HO) command to the UE. The HO command can be a radio resource control (RRC) connection reconfiguration message including mobility control information.

During the third phase, as indicated by the signaling line 3, the UE performs the handover, detaching from the source cell (cell 2) and synchronizing to the target cell (cell 3), as commanded by the source eNB. The UE may access the target cell via random access channel (RACH). When the UE has successfully accessed the target cell, the UE sends a RRC connection reconfiguration complete message to confirm the handover, to the target eNB to indicate that the handover procedure is completed for the UE. Then, the target eNB can now begin sending data to the UE.

With the emergence of various traffic tools, especially the development of high-speed trains, the mobility environment is more complex than ever.

FIG. 2 illustrates an example of a too-late handover of a UE due to high-speed movement. The scenario as shown in FIG. 2 is similar to that shown in FIG. 1, except that the UE in FIG. 2 moves fast. For example, the UE is carried by a person traveling in a high-speed train.

Due to the high moving speed of the train (e.g., more than 250 km/h and up to 350 km/h), there exists a possibility that after the fast-moving UE sends a measurement report in a source cell (e.g., cell 2 in the example shown in FIG. 2), the UE moves out of the source cell fast and into another cell (e.g., cell 3), and hence is unable to receive a handover command sent from the source eNB (e.g., eNB A). This kind of handover failure is regarded as too-late handover, as shown in FIG. 2.

In Reference 1 (WO2013/097063A1), a kind of optimization approach with adjustable handover triggering condition is adopted to solve the above problem. FIG. 3 illustrates an example of an advanced handover for a fast-moving UE according to the disclosure of Reference 1. The scenario as shown in FIG. 3 is similar to that shown in FIG. 2, and the UE in FIG. 3 also moves fast. For example, the UE is carried by a person traveling in a high-speed train.

As shown in FIG. 3, for the fast-moving UE, the handover is triggered in advance. As indicated by the signaling line 1, a measurement report is triggered and sent from the UE to a source eNB (e.g., eNB A in this example) which serves a source cell (e.g., cell 2 in this example), before the UE enters into the overlapping region of the source cell and a target cell (e.g., cell 3). Then, as indicated by the signaling line 2, a handover command sent from the source eNB can be received by the UE before the source eNB cannot reach the UE. Thereafter, as indicated by the signaling line 3, the UE performs the handover as commanded by the source eNB. When the UE has successfully accessed the target cell, the UE sends a RRC connection reconfiguration complete message to confirm the handover, to the target eNB to indicate that the handover procedure is completed for the UE. Then, the target eNB can now begin sending data to the UE.

However, in practice, it is quite possible that some low-speed UEs are also moving in the same area, e.g., when the train is moving in a low speed in some abnormal working mode, or when there is a pedestrian road built parallel to the railway. Then, if the advanced handover triggering condition is applied to the UEs on the pedestrian road, another type of handover failure may occur, which is referred to as a too-early handover. FIG. 4 illustrates an example of a too-early handover of a UE due to low-speed movement. The scenario as shown in FIG. 4 is similar to that shown in FIG. 1, except that the advanced handover triggering condition is applied to the UE with a low speed.

As shown in FIG. 4, for the low-speed UE, the handover is also triggered in advance. As indicated by the signaling line 1, a measurement report is triggered and sent from the UE to a source eNB (e.g., eNB A) which serves a source cell (e.g., cell 2), before the UE enters into the overlapping region of the source cell and a target cell (e.g., cell 3). Then, as indicated by the signaling line 2, a handover command sent from the source eNB is received by the UE. However, due to the low speed of the UE, during the third phase as indicated by the signaling line 3, the UE sends a RRC connection reconfiguration complete message to the target eNB (e.g., eNB B) before the UE enters into the target cell. Thus, the target eNB is unable to receive this RRC message, because the UE has not entered the effective coverage of the target cell, and the handover procedure fails.

To avoid handover failure in such complex scenarios, it is required to distinguish between high-speed UEs and low-speed UEs and then set different handover conditions to them, making sure that they have either earlier or normal handover triggering condition respectively.

Some high-speed/low-speed UE identification methods operated at an eNB are proposed. One of the major used methods is based on physical layer uplink Doppler Frequency-Offset Estimation (FOE). Reference 1 also discloses a method for identifying a high-speed UE in high speed railway, which is based on information of UE past cells and the cell deployment.

However, in practical network operations, it is difficult or even impossible for the operator to manually and correctly configure the UE identification criteria. For example, when Doppler FOE is used to identify UE speed, the criteria are strongly dependent on the distance between the eNB and the railway, the cell size, and even the railway trail line shape.

SUMMARY

To address one or more of the above concerns, it would be desirable in the art to provide a self-optimization method for criteria of identifying a UE in terms of speed.

In a first aspect, a method in a base station, BS, of a cellular radio system for optimizing criteria of identifying a user equipment, UE, as in a first UE group or a second UE group is provided. A speed of any UE in the first UE group is higher than a speed of any UE in the second UE group. The method comprises: detecting one or more handover failure events of at least one of the first UE group and the second UE group; determining whether there is any UE misidentified in the first or second UE group based on the one or more handover failure events; and in response to determining that there is a UE misidentified in the first or second UE group, adjusting at least one of the criteria of identifying a UE as in the first UE group and the criteria of identifying a UE as in the second UE group.

In some embodiments, after the detecting, the method may further comprise: in response that a predefined number of too-early or too-late handover events of the first UE group or the second UE group are detected, modifying a handover triggering condition for a respective UE group. In these embodiments, the determining may comprise: in response that, after a predetermined number of the modifying or after a predetermined period of time of the modifying, the handover triggering condition for the first UE group or the second UE group fails to reach a steady state where the number of detected handover failure events in a respective UE group is below a predefined threshold, determining that a UE is misidentified in the respective UE group.

In some other embodiments, the determining may comprise: in response that a predefined number of too-early handover events of the first UE group are detected where a difference of signal quality between a target cell and a source cell associated with a respective too-early handover event is larger than a first threshold, determining that a UE is misidentified in the first UE group; or in response that a predefined number of too-late handover events of the second UE group are detected where a difference of signal quality between a target cell and a source cell associated with a respective too-late handover event is smaller than a second threshold, determining that a UE is misidentified in the second UE group.

In some yet other embodiments, the determining may comprise: in response that a predefined number of too-early handover events are detected, determining that a UE is misidentified in the first UE group; or in response that a predefined number of too-late handover events are detected, determining that a UE is misidentified in the second UE group.

In some further embodiments, the adjusting may comprise: in response to determining that a UE is misidentified in the first UE group, upgrading the criteria of identifying a UE as in the first UE group and/or degrading the criteria of identifying a UE as in the second UE group; or in response to determining that a UE is misidentified in the second UE group, degrading the criteria of identifying a UE as in the first UE group and/or upgrading the criteria of identifying a UE as in the second UE group.

In some further embodiments, the criteria of identifying a UE as in the first UE group or the second UE group may be based on Doppler Frequency-Offset Estimation, FOE. With Doppler FOE, a UE can be identified as in the first UE group if a Doppler-FOE related parameter of the UE is higher than a third threshold, and a UE can be identified as in the second UE group if the Doppler-FOE related parameter is lower than a fourth threshold.

In such embodiments, the degrading the criteria of identifying a UE as in the first UE group may comprise decreasing the third threshold, the upgrading the criteria of identifying a UE as in the second UE group may comprise decreasing the fourth threshold, the upgrading the criteria of identifying a UE as in the first UE group may comprise increasing the third threshold, and the degrading the criteria of identifying a UE as in the second UE group may comprise increasing the fourth threshold.

In a second aspect, a base station, BS, of a cellular radio system for optimizing criteria of identifying a user equipment, UE, as in a first UE group or a second UE group is provided. A speed of any UE in the first UE group is higher than a speed of any UE in the second UE group. The base station comprises: a detecting module configured to detect one or more handover failure events of at least one of the first UE group and the second UE group; a determining module configured to determine whether there is any UE misidentified in the first or second UE group based on the one or more handover failure events; and an adjusting module configured to, in response to determining that there is a UE misidentified in the first or second UE group, adjust at least one of the criteria of identifying a UE as in the first UE group and the criteria of identifying a UE as in the second UE group.

In a third aspect, a base station, BS, of a cellular radio system for optimizing criteria of identifying a user equipment, UE, as in a first UE group or a second UE group is provided. A speed of any UE in the first UE group is higher than a speed of any UE in the second UE group. The base station comprises: a processor; and a memory. The memory contains instructions executable by said processor, whereby said base station is operative to: detect one or more handover failure events of at least one of the first UE group and the second UE group; determine whether there is any UE misidentified in the first or second UE group based on the one or more handover failure events; and in response to determining that there is a UE misidentified in the first or second UE group, adjust at least one of the criteria of identifying a UE as in the first UE group and the criteria of identifying a UE as in the second UE group.

In a fourth aspect, a base station, BS, of a cellular radio system for optimizing criteria of identifying a user equipment, UE, as in a first UE group or a second UE group is provided. A speed of any UE in the first UE group is higher than a speed of any UE in the second UE group. The base station comprises: processing means adapted to: detect one or more handover failure events of at least one of the first UE group and the second UE group; determine whether there is any UE misidentified in the first or second UE group based on the one or more handover failure events; and in response to determining that there is a UE misidentified in the first or second UE group, adjust at least one of the criteria of identifying a UE as in the first UE group and the criteria of identifying a UE as in the second UE group.

In a fifth aspect, a non-transitory computer-readable storage media having computer program code stored thereon is provided. The computer program code is configured to, when executed, cause an apparatus to perform actions in the method according to the first aspect as above described.

It should be noted that, corresponding embodiments of the first aspect are also applicable for the second aspect, the third aspect, the fourth aspect, and the fifth aspect.

With particular embodiments of the techniques described in this specification, by the detection of handover failure events, the UE identification criteria can be automatically adjusted, which can improve the handover success rate in communication systems. Further, with the proposed solutions, the work load for operator's manual deployment and maintenance about the cells could be relieved.

Other features and advantages of the embodiments herein will also be understood from the following description of specific embodiments when read in conjunction with the accompanying drawings, which illustrate, by way of example, the principles of embodiments.

BRIEF DESCRIPTION OF THE DRAWINGS

The above and other aspects, features, and benefits of various embodiments herein will become more fully apparent, by way of example, from the following detailed description and the accompanying drawings, in which.

Like reference numbers and designations in the various drawings indicate like elements.

DETAILED DESCRIPTION

Hereinafter, the principle and spirit of the present disclosure will be described with reference to the illustrative embodiments. It should be understood, all these embodiments are given merely for the skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

In the following description, a base station (BS) is an entity for allocating resources to a terminal and can be any of an enhanced Node B (eNB), a Node B, a BS, a radio access unit, a base station controller, and a node on a network. The terminal can be a user equipment (UE), a mobile station (MS), a cellular phone, a smart phone, a computer, or a multimedia system equipped with communication function. Please be noted that, the terms "user terminal" and "user equipment" can be used interchangeable hereinafter.

It should be noted that, terms "high speed" and "low speed" used herein are relative. In different environments, different speeds can be considered as high speed or low speed. Briefly, a speed higher than a threshold A can be considered as a high speed, and a speed lower than a threshold B can be considered as a low speed. The threshold A and threshold B can be same or different. For example, in a high speed train scenario, a speed more than 250 km/h can be considered as a high speed and a speed lower than 160 km/h can be considered as a low speed. It should be further noted that, although some embodiments herein have been described in the high-speed train scenario, the proposed solutions can be applied in any high-speed UE involved scenario.

While embodiments are described below in the context of a LTE type cellular network for illustrative purposes, those skilled in the art will recognize that the embodiments disclosed herein can also be applied to various other types of cellular networks.

As mentioned previously, some high-speed/low-speed UE identification methods operated at an eNB are proposed. One of the major used methods is based on physical layer uplink Doppler Frequency-Offset Estimation (FOE).

Uplink Doppler FOE is an effective and wide-applied method to identify UEs with different speeds. When a UE is moving toward or away from the eNB, the uplink frequency offset is proportional to the moving speed relative to the eNB, which can be expressed as blow:

$$FOE = \frac{v \cdot \cos\theta}{c} \cdot f_c, \qquad (2)$$

Where $f_c$ is the carrier frequency, v is the moving speed of the UE relative to the eNB, and c is a constant value of light speed. When $f_c$ is 2.6 GHz and v is 350 km/h, Doppler FOE equals 842 Hz.

Figure 5:
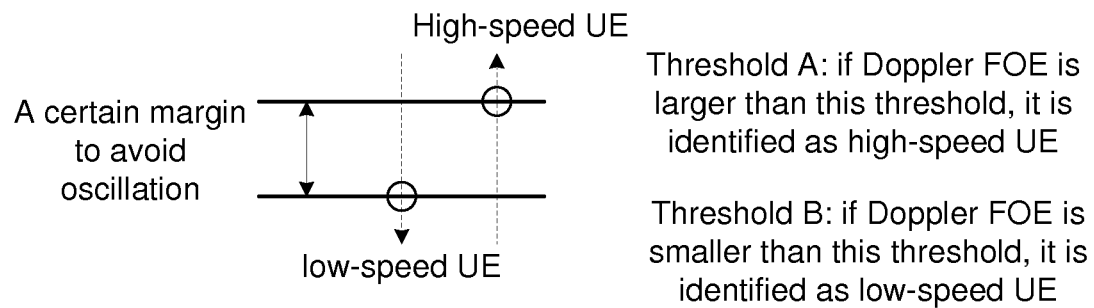
FIG. 5 schematically illustrates the basic principle of Doppler FOE based method for identifying a high-speed or a low-speed UE.

FIG. 5 schematically illustrates the basic principle of Doppler FOE based method for identifying a high-speed or a low-speed UE.

As shown in FIG. 5, two thresholds could be given. If Doppler FOE for a UE is larger than threshold A, the UE will be identified as a high-speed UE; if Doppler FOE for a UE is smaller than threshold B, the UE will be identified as a low-speed UE.

Threshold A should not be smaller than threshold B, and the two thresholds could have a certain margin between them to avoid oscillation, as shown in FIG. 5.

Alternatively, according to the linear relationship between the FOE and the moving speed of the UE relative to the eNB, the thresholds may be speed values, which are used to be compared with the calculated moving speed of a UE.

In ideal cases, the application of Doppler FOE based method could effectively identify the high-speed UE, but the practical settings of thresholds or conditions therein greatly rely on the cell deployment and the moving direction of the UE relative to the eNB.

Figure 6:
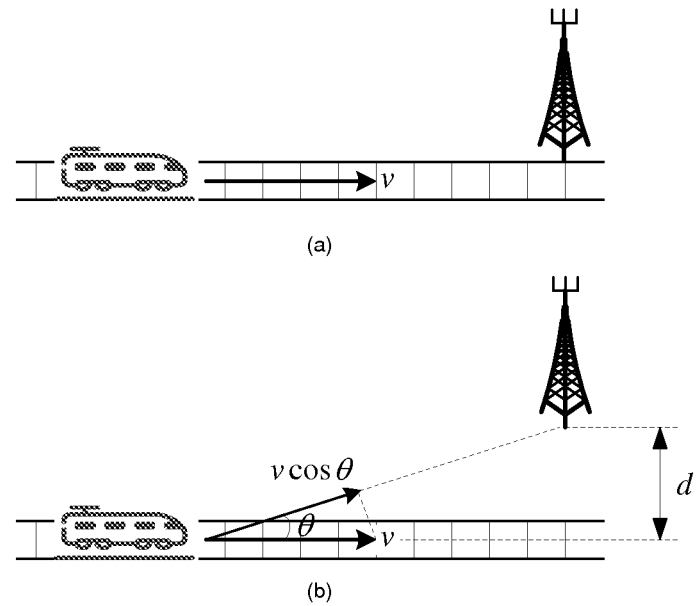
FIG. 6 schematically illustrates variant speed contribution with moving direction of the UE relative to the eNB.

FIG. 6 schematically illustrates variant speed contribution with moving direction of the UE relative to the eNB. In the example shown in FIG. 6, the high-speed train scenario is taken as an example for illustration, and the UE locates in the fast moving train. Thus, the moving speed of the UE relative to the eNB is the moving speed of the train, and the speed contribution to the FOE relates to the distance between the eNB and the railway.

FIG. 6(a) depicts a case where the eNB locates very close to the railway. In such a case, the UE speed could totally contribute to the value of v in equation (1), as shown in FIG. 6 (a).

FIG. 6(b) depicts another case where the eNB locates a certain distance away from the railway. In FIG. 6(b), the distance between the eNB and the railway is denoted as d. In such as case, only a part of the UE speed, i.e. radical component, could contribute to the value of v in equation (1). Mathematically, the equation can be expressed as blow:

$$FOE = \frac{v}{c} \cdot f_c, \quad (1)$$

where θ is the angle between the UE movement direction and the line connecting the UE and the eNB. The larger the distance d is, the larger the angle θ would be, and the smaller the estimated FOE. For example, when θ is 60 degree, the estimated FOE in the case of FIG. 6(b) is only half of the value in the case of FIG. 6(a). This causes great difficulty when setting the threshold to judge high-speed UE in high-speed UE involved environment, since the estimated FOE varies with the value of d and the moving location of the UE.

If the thresholds of FOE to identify high-speed/low-speed UEs are set inappropriately, the effect of handover optimization method for a high-speed UE involved environment would be greatly limited. For example, due to a larger angle θ=60°, with $f_c$ as 2.6 GHz and v as 350 km/h, the calculated FOE=421 Hz. If threshold A is set to larger than 421 Hz, like 600 Hz, a UE with a speed of 350 km/h (whose FOE is 421 Hz in this example) would be misidentified as a low-speed UE, because the FOE is lower than the threshold A of 600 Hz.

Reference 1 (WO2013/097063A1) discloses another method for identifying a high-speed UE in a high speed railway, which is based on information of UE past cells and the cell deployment.

Figure 7:
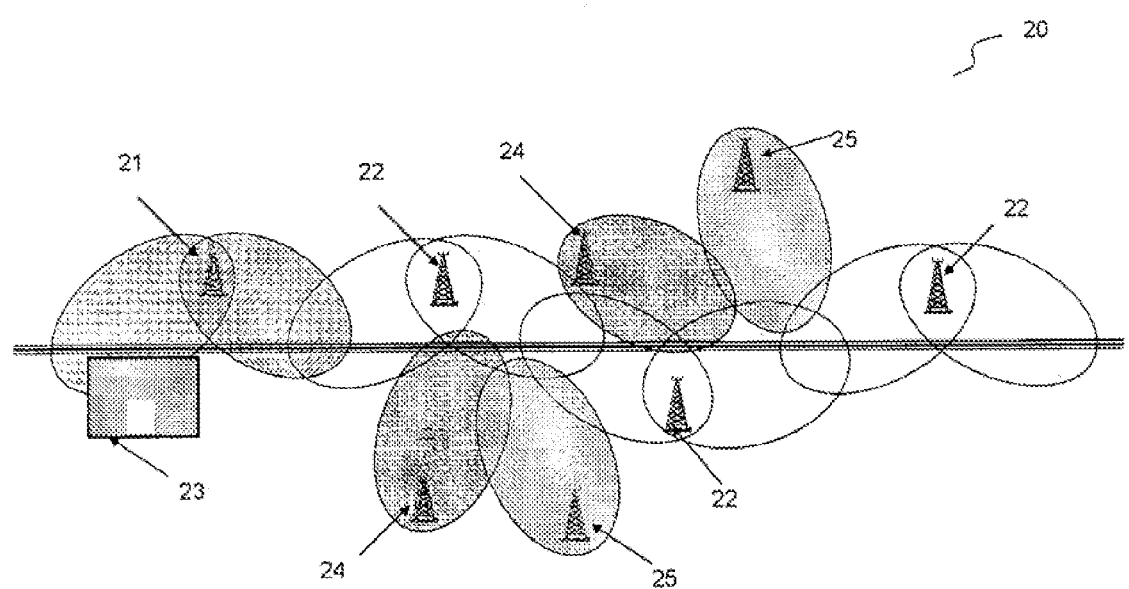
FIG. 7 schematically illustrates a general sketch of cell deployment along a high speed railway.

FIG. 7 schematically illustrates a general sketch of cell deployment along a high speed railway according to Reference 1. In FIG. 7, different categories of the cells are shown along the high speed railway. In the solution of Reference 1, a UE is identified whether it is a high speed railway UE based on categories of cells that the UE is connected to or camped on in a certain period. More specifically, a UE is identified as the high speed railway UE if at least one of the following conditions is met: past M cells the UE camps on or connects to are all high speed railway cells; and past N cells the UE camps on or connects to match a predetermined camping or connecting cell list. M and N are configurable parameters. Any details of this method can be referred to Reference 1 and will not be described herein.

If the UE identification method proposed in Reference 1 is adopted, the problem of inaccuracy also exists, e.g., because the parameters of M and N also need to be tuned according to the cell geographic deployment and train speed plan in the route.

In practice, to figure out the cell coverage and the locations of base stations relative to the railway, a large amount of cell dimension and radio measurements are required, so it is difficult or even impossible for the operator to configure correct conditions for each cell manually. Besides, in some cases, the railway is not straight but curving nearby a base station, then the effective distance between this base station and railway is very difficult to calculate manually, and hence the correct setting of high-speed UE identification condition are unobtainable.

It should be noted that to cope with the bad handover success rate in e.g., high speed train (HST) systems, the prior art only proposes to adjust handover triggering condition so as to advance the handover process, but does not propose to solve the inaccuracy problem of high-speed UE identification for example due to variant distances between eNB and the railway.

In fact, to improve handover success rate for HST systems, only adjusting handover triggering condition but without accurate UE identification would fail.

Embodiments herein take into account the inaccuracy of UE identification, and propose a method to automatically optimize the criteria of identifying a UE in high-speed UE involved systems.

Figure 8:
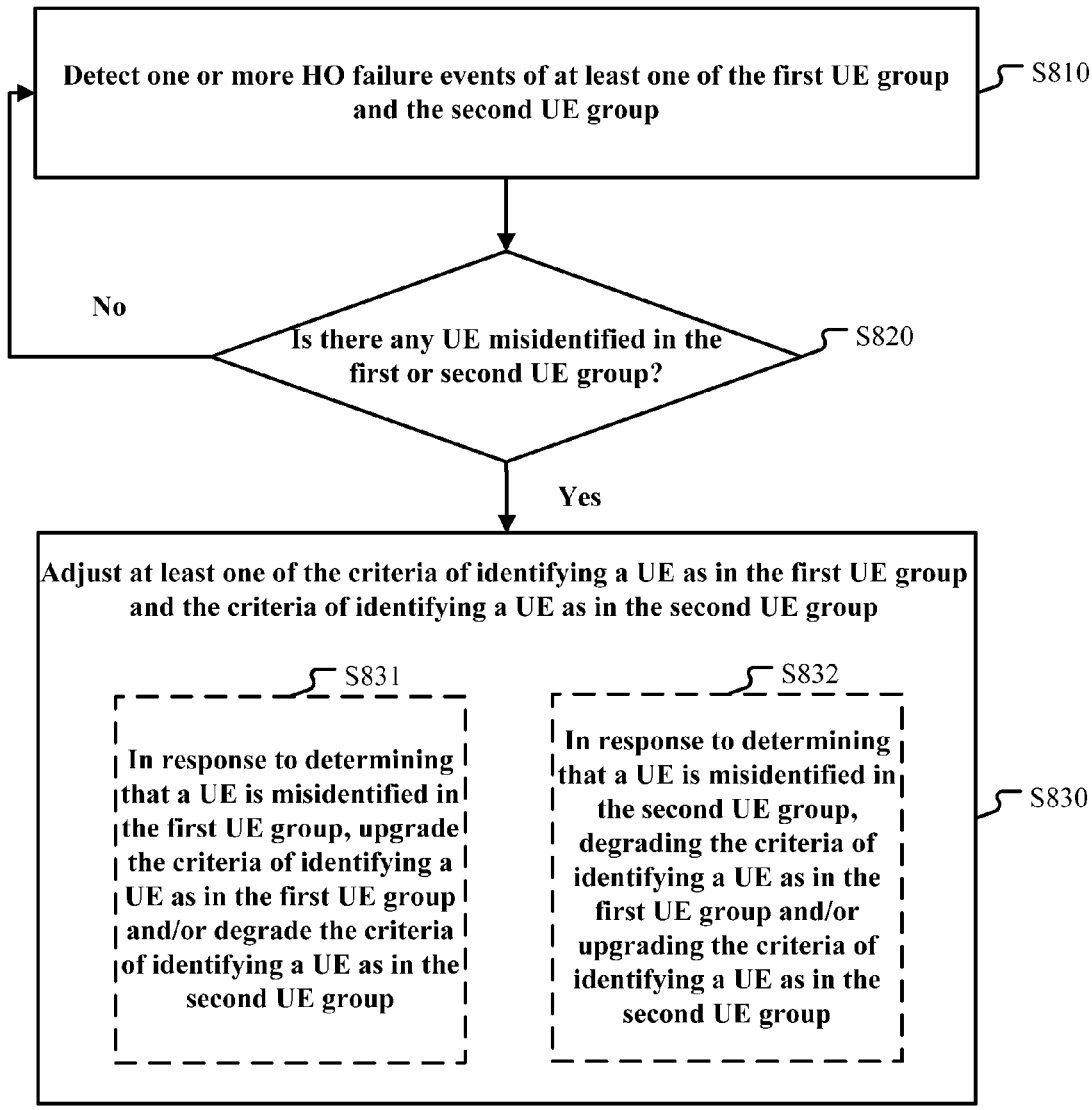
FIG. 8 illustrates an exemplary flowchart of a method for optimizing the criteria of identifying a UE according to embodiments herein.

FIG. 8 illustrates an exemplary flowchart of a method for optimizing the criteria of identifying a UE according to embodiments herein. The method can be implemented in a base station of a cellular radio system. The criteria are used to identify a UE as in a first UE group or a second UE group. A speed of any UE in the first UE group is higher than a speed of any UE in the second UE group. The first UE group can be referred to as a high-speed UE group, and the second UE group can be referred to as a low-speed UE group.

As shown in FIG. 8, at block S810, one or more handover failure events of at least one of the first UE group and the second UE group are detected. The method for detecting a handover failure event is known in the art. For example, in the $3^{rd}$ Generation Partnership Project (3GPP) Technical Specification 36.300 V11.7.0 (2013-September), section 22.4.2.2, the detection of connection failure due to intra-LTE mobility is described. Connection failures may occur due to too-early or too-late Handovers, or Handover to Wrong Cell, which have been defined in 3GPP TS 36.300 V11.7.0.

If the UE mobility is more aggressive than what the handover parameter settings allow for, handover can be triggered when the signal strength of the source cell is already too low—leading to a Radio Link Failure (RLF); or handover may not be triggered at all if a RLF preempts it. Thus, signature of too-late handovers may be summarized by: an RLF occurs after the UE has stayed for a long period of time in the cell; the UE attempts to re-establish the radio link connection in a different cell.

If the UE mobility is less aggressive than what the handover parameter settings allow for, handover can be triggered when the signal strength of the target cell is not high enough—leading to an RLF shortly after the UE successfully connected to the target cell; or the UE re-establishes the connection in the source cell. Thus, signature of too-early handovers may be summarized by: an RLF occurs shortly after a successful handover from a source cell to a target cell or a handover failure occurs during the handover procedure; the UE attempts to re-establish the radio link connection in the source cell.

If the Cell Individual Offset (CIO) parameters are set incorrectly, the handover, albeit timed correctly, will be directed towards a wrong cell. Signature of handover to a wrong cell may be summarized by: an RLF occurs shortly after a successful handover from a source cell to a target cell or a handover failure occurs during the handover procedure; the UE attempts to re-establish the radio link connection in a cell other than the source cell and the target cell.

As seen from the above definitions, Handover to Wrong Cell event is similar to too-early Handover for the target cell. Thus, in the description herein, Handover to Wrong Cell event can be categorized as too-early Handover. That is to say, unless specified explicitly in the context, too-early Handover events as described herein also include Handover to Wrong Cell events.

The detection of the above events, when involving more than one eNB, is enabled by the RLF Indication and Handover Report procedures, which is known in the art, and thus the description thereof is omitted herein. In this way, the eNB can be aware of those handover failure events.

Then, at block S820, it is determined whether there is any UE misidentified in the first or second UE group based on the detected one or more handover failure events.

The determination can be implemented in several ways, which will be described later with reference to FIGS. 9-11.

In response to determining that there is a UE misidentified in the first or second UE group, at block S830, at least one of the criteria of identifying a UE as in the first UE group and the criteria of identifying a UE as in the second UE group is adjusted.

In particular, as shown at block S831, in response to determining that a UE is misidentified in the first UE group, i.e., a low-speed UE is misidentified as a high-speed UE, the criteria of identifying a UE as in the first UE group can be upgraded or tightened; and/or the criteria of identifying a UE as in the second UE group can be degraded or loosened.

Additionally or alternatively, as shown at block S832, in response to determining that a UE is misidentified in the second UE group, i.e., a high-speed UE is misidentified as a low-speed UE, the criteria of identifying a UE as in the first UE group can be degraded or loosened; and/or the criteria of identifying a UE as in the second UE group can be upgraded or tightened.

Thus the above has described an exemplary flowchart of a method for optimizing the criteria of identifying a UE according to embodiments herein. As disclosed, the proposed method can automatically adjust the criteria of identifying a UE as in the first UE group (e.g., the high-speed UE group) or the second UE group (e.g., the low-speed UE group), based on the detected handover failure events. Intuitively, the handover success rate in high-speed UE involved scenarios can be improved. Further, such adjustment does not rely on the cell deployment or the location of the BS, but on the detected handover failure events. Thus by the proposed self-optimizing operations, the work load for operator's manual deployment and maintenance about those high-speed UE involved cells could be relieved. In addition, this automatic adjustment can drive the network configuration always towards to a direction with low handover failure rate.

Figure 9:
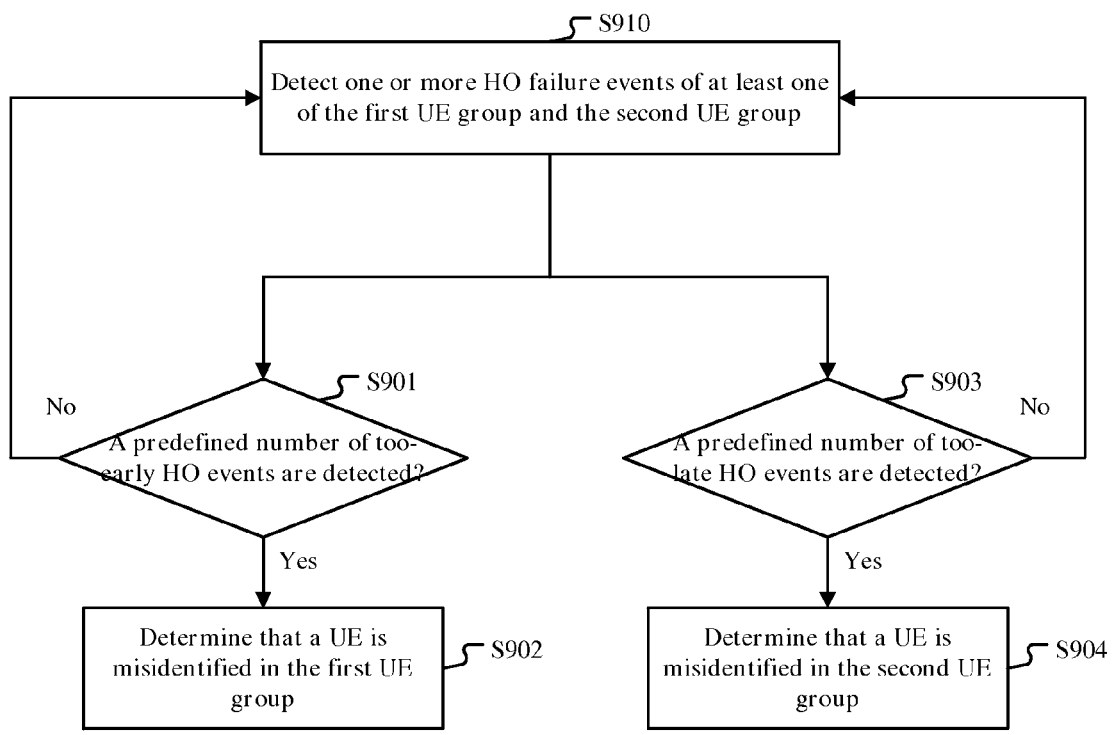
FIG. 9 illustrates an exemplary procedure for determining whether there is any UE misidentified according to one embodiment herein.

FIG. 9 illustrates an exemplary procedure for determining whether there is any UE misidentified according to one embodiment herein. As mentioned previously, in the framework of handover performance improvement for high-speed UE scenario, UE identification is the preliminary step before adjusting the handover triggering condition. Therefore, in this embodiment, the assumption is that the handover triggering condition is fixed, and the handover failure events are merely caused by the inappropriate criteria of identifying a UE as in the first UE group or the second UE group.

As shown in FIG. 9, at block S910, one or more handover failure events of at least one of the first UE group and the second UE group are detected, which is the same as block S810 in FIG. 8. Then, the process can be branched according to the type of detected handover failure events.

For those too-early handover events, at block S901, it may be determined whether a predefined number of too-early handover events are detected e.g. during a predefined period or an evaluation period. Those skilled in the art could understand that, the predefined number can be set appropriately in order to avoid frequent adjustment.

Then, at block S902, in response that a predefined number of too-early handover events are detected, it can be determined that a UE is misidentified in the first UE group. In other words, it can be deduced that a low-speed UE is misidentified as a high-speed UE, which causes the too-early handover events.

Similarly, for those too-late handover events, at block S903, it may be determined whether a predefined number of too-late handover events are detected e.g. during a predefined period or an evaluation period. Also, the predefined number can be set appropriately in order to avoid frequent adjustment.

Then at block S904, in response that a predefined number of too-late handover events are detected, it can be determined that a UE is misidentified in the second UE group. In other words, it can be deduced that a high-speed UE is misidentified as a low-speed UE, which causes the too-late handover events.

The embodiment of FIG. 9 can be considered as an optimization solution of UE identification criteria under the assumption of fixing the handover triggering condition, which can be easily applied and the implementation thereof is very simple.

On the other hand, the technique of "mobility robustness optimization (MRO)" provides an approach to optimize the handover parameter in a cellular network, with the target to improve the handover performance The MRO technique has been introduced in section 22.4.2 of 3GPP TS 36.300 V11.7.0 (2013 September) and in section 4.5 of 3GPP TR 36.902 V9.3.1 (2011 March).

For a connected-mode, by adjusting the handover parameter "cell individual offset (CIO)" in the handover triggering condition, the border of a cell-relation can be moved. The triggering of such kind of auto-adjustment is based on the statistics of some pre-defined events in every evaluation period, including too-early HO, too-late HO, HO to wrong cell. In other words, the handover triggering condition could be adjusted by the detection of too-early/too-late Handover events. The MRO can be regarded as an optimization solution of the handover triggering condition under the assumption of fixing the UE identification criteria.

Therefore, to further improve the performance and to make these two kinds of optimization compatible, it is proposed that based on the detection of handover failure events, the optimization of the UE identification criteria and the optimization of handover triggering condition are combined.

Figure 10:
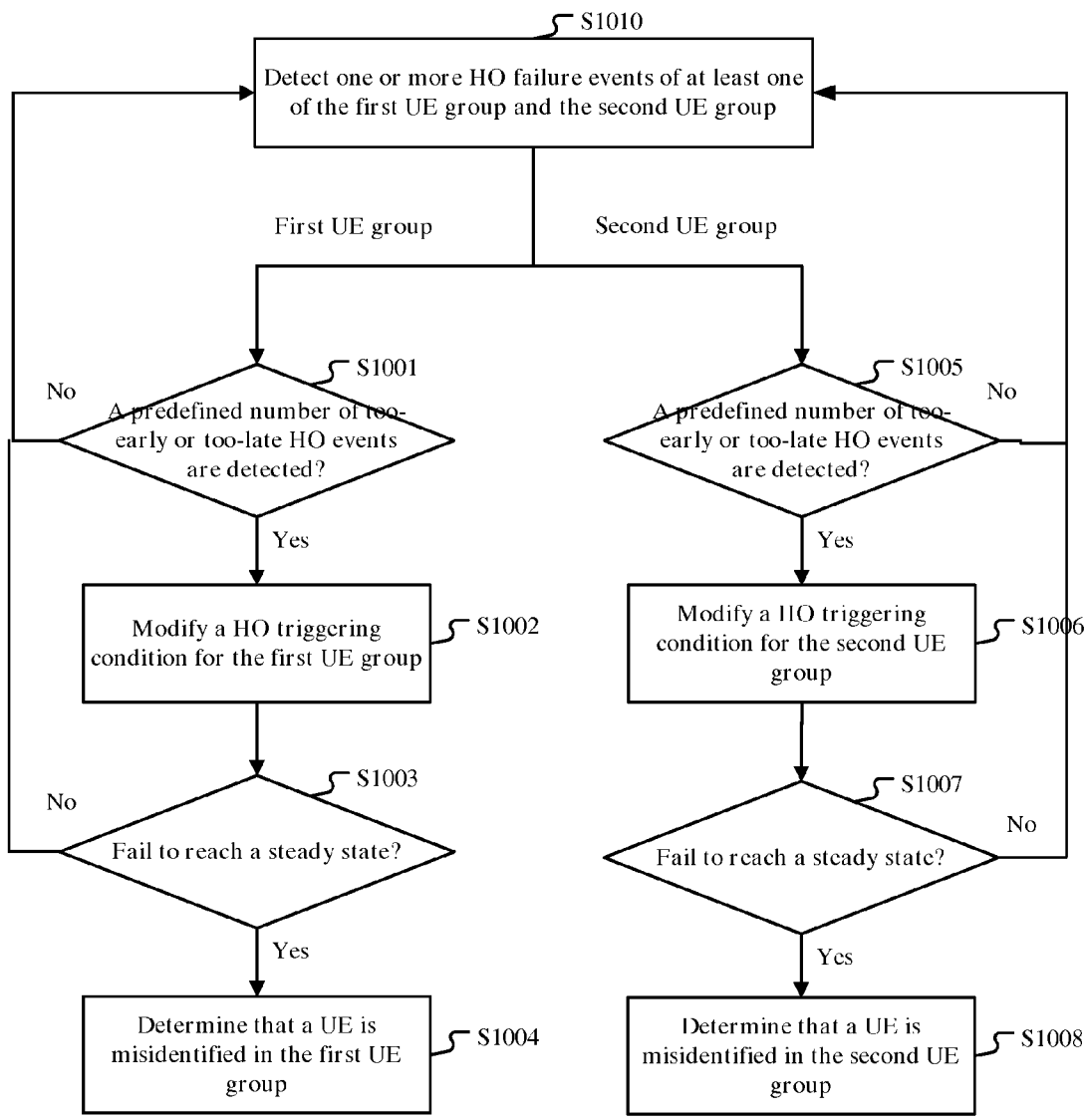
FIG. 10 illustrates an exemplary procedure for determining whether there is any UE misidentified according to another embodiment herein.

FIG. 10 illustrates an exemplary procedure for determining whether there is any UE misidentified according to another embodiment herein. In this embodiment, the optimization of UE identification criteria and the optimization of handover triggering condition are executed in a sequent and iterative manner.

As shown in FIG. 10, at block S1010, one or more handover failure events of at least one of the first UE group and the second UE group are detected, which is the same as block S810 in FIG. 8 and block S910 in FIG. 9.

Then, based on the detected handover failure events, optimization of the handover triggering condition can be executed first. The process can be branched for the first UE group and the second UE group, and the handover triggering condition for the first UE group or the second UE group can be modified independently.

For the first UE group, at block S1001, it may be determined whether a predefined number of too-early or too-late handover events of the first UE group are detected, e.g. during an evaluation period. The detection method can be implemented as previously described with respective to block S810. If the answer is negative at block S1001, the process returns to block S1010 where handover failure events are detected continuously.

If the answer is positive at block S1001, then at block S1002, in response to determining that the predefined number of too-early or too-late handover events of the first UE group are detected, the handover triggering condition for the first UE group can be modified.

In some embodiment, the handover parameter such as Cell Individual Offset (CIO) which can control advance or delay of handover triggering point in a specific cell, can be modified. The parameter CIO is used to be added to a measured signal quality value for evaluating an event, e.g. evaluating measurement report triggering events.

For example, when evaluating event A3 "Neighbour becomes amount of offset better than PCell" as defined in section 5.5.4.1 of 3GPP TS 36.331, V11.5.0 (2013September), consider the entering condition for this event to be satisfied when condition A3-1, as specified below, is fulfilled:

$$Mn+Ofn+Ocn-Hys>Mp+Ofp+Ocp+Off, \quad \text{A3-1}$$

Where Mn is the measurement result of the neighbouring cell (or the target cell), not taking into account any offsets; Ofn is the frequency specific offset of the frequency of the neighbour cell; Ocn is the cell specific offset of the neighbour cell (i.e. cellIndividualOffset), and set to zero if not configured for the neighbour cell; Mp is the measurement result of the PCell (or the source cell), not taking into account any offsets; Ofp is the frequency specific offset of the primary frequency; Ocp is the cell specific offset of the PCell (i.e. cellIndividualOffset), and is set to zero if not configured for the PCell; Hys is the hysteresis parameter for this event; Off is the offset parameter for this event. Mn, Mp are expressed in dBm in case of Reference Signal Received Power (RSRP), or in dB in case of Reference Signal Received Quality (RSRQ). Ofn, Ocn, Ofp, Ocp, Hys, Off are expressed in dB. Exemplarily in the below context the Ocp is set to zero, and the CIO value is equal to Ocn.

The parameter CIO may have two values each of which is for high-speed UE or low-speed UE, respectively. For example, $CIO\_high$ of 3 dB may be appropriate for the first UE group, i.e., high-speed UE group, so as to advance the handover triggering point, and CIO_low of 0 dB may be appropriate for the second UE group, i.e., low-speed UE group.

When the UE identification criteria are correct, i.e., the high/low-speed UE identification criteria are fixed, once a handover failure event of the first UE group or the second UE group is detected, this event would be included into the statistics of the respective UE group. In this way, each UE group can adjust its associated CIO values based on the detection of too-early handover event and too-late handover event.

More specifically, at block S1002, in response that a predefined number of too-early events of the first UE group are detected, which means that the CIO value is too high (e.g., 6 dB) and advance the handover triggering point too much, the CIO value for the first UE group (i.e., CIO_high) can be decreased by for example 3 dB. Alternatively, in response that a predefined number of too-late events of the first UE group are detected, which means that the CIO value is too low (e.g., 0 dB) and fails to advance the handover triggering point, the CIO value for the first UE group (i.e., CIO_high) can be increased by for example 3 dB.

However, when the UE identification criteria are incorrect, some low-speed UE could be misidentified in the first UE group (i.e., high-speed UE group), and/or some high-speed could be misidentified in the second UE group (i.e., low-speed UE group). Then, it would cause abnormal results during the modifying of the handover triggering condition, which is explained below for the first UE group.

Suppose that CIO_high of 3 dB is appropriate for the first UE group, i.e., high-speed UE group, so as to advance the handover triggering point properly. If at step 1, the current CIO_high is set too high, e.g., 6 dB, then both high-speed UEs and low-speed UEs identified in the first UE group would encounter too-early handover events. In response that a predefined number of too-early handover events of the first UE group are detected, the value of CIO_high can be decreased, e.g., to 3 dB.

Then, at step 2, the current CIO_high is 3 dB, and the high-speed UEs in the first UE group can perform handover successfully. However, a low-speed UE misidentified in the first UE group would still encounter a too-early handover event. According to the MRO technique, in response that a predefined number of too-early handover events of the first UE group are detected, the value of CIO_high will be decreased further, e.g., to 0 dB.

Then, at step 3, the current CIO_high is 0 dB, which will not advance the handover triggering point. It can be envisaged that the high-speed UEs in the first UE group would encounter too-late handover events. Thereafter, according to the MRO technique, the value of CIO_high will be increased, e.g., to 3 dB, in response to the detection of a predefined number of too-late handover events of the first UE group.

Obviously, step 2 and step 3 would repeat endlessly and the MRO method (i.e., modifying the handover triggering condition for the first UE group) could not reach a steady status. The steady status can be defined as a state where the number of detected handover failure events in a respective UE group is below a predefined threshold.

Thus, at block S1003, it may be determined whether the handover triggering condition for the first UE group fails to reach a steady state, after a predetermined number of modifying or after a predetermined period of time of modifying of the handover triggering condition for the first UE group. If No, then the process goes back to block S1010 to detect further handover failure events. If yes, at block S1004, it can be determined that a UE is misidentified in the first UE group. In other words, a low-speed UE is misidentified as in the high-speed UE group, which causes the endless loop of modifying of the handover triggering condition, i.e., the endless loop of step 2 and step 3.

Similarly, for the second UE group, at block S1005, it may be determined whether a predefined number of too-early or too-late handover events of the second UE group are detected, e.g. during an evaluation period. The detection method can be implemented as previously described with respective to block S810. If the answer is negative at block S1005, the process returns to block S1010 where handover failure events are detected continuously.

If the answer is positive at block S1005, then at block S1006, in response to determining that a predefined number of too-early or too-late handover events of the second UE group are detected, the handover triggering condition for the second UE group can be modified.

Also, in some embodiment, the modifying of the handover triggering condition may comprise modifying the handover parameter CIO, in particular, the value of CIO_low for the second UE group or low-speed UE group. Normally, CIO_low of 0 dB may be appropriate for the second UE group.

More specifically, at block S1006, in response that a predefined number of too-late events of the second UE group are detected, which means that the CIO value is too low (e.g., −3 dB) and delay the handover triggering point too much, the CIO value for the second UE group (i.e., CIO_low) can be increased by for example 3 dB. Alternatively, in response that a predefined number of too-early events of the second UE group are detected, which means that the CIO value is too high (e.g., 3 dB) and fails to delay the handover triggering point, the CIO value for the second UE group (i.e., CIO_low) can be decreased by for example 3 dB.

However, when the UE identification criteria are incorrect, some low-speed UE could be misidentified in the first UE group (i.e., high-speed UE group), and/or some high-speed could be misidentified in the second UE group (i.e., low-speed UE group). Then, it would cause abnormal results during modifying of the handover triggering condition, which is explained below for the second UE group.

Suppose that CIO_low of 0 dB is appropriate for the second UE group, i.e., low-speed UE group, so as to trigger the handover triggering point normally. If at step A, the current CIO_low is set too low, e.g., −3 dB, then both high-speed UEs and low-speed UEs identified in the second UE group would encounter too-late handover events. In response that a predefined number of too-late handover events of the second UE group are detected, the value of CIO_low can be increased, e.g., to 0 dB.

Then, at step B, the current CIO_low is 0 dB, and the low-speed UEs in the second UE group can perform handover successfully. However, a high-speed UE misidentified in the second UE group would still encounter a too-late handover event. According to the MRO technique, in response that a predefined number of too-late handover events of the second UE group are detected, the value of CIO_low will be increased further, e.g., to 3 dB.

Then, at step C, the current CIO_low is 3 dB, which will advance the handover triggering point. It can be envisaged that the low-speed UEs in the second UE group would encounter too-early handover events. Thereafter, according to the MRO technique, the value of CIO_low will be decreased, e.g., to 0 dB, in response to the detection of a predefined number of too-early handover events of the second UE group.

Obviously, step B and step C would repeat endlessly and the MRO method (i.e., modifying the handover triggering condition for the second UE group) could not reach a steady status where the number of detected handover failure events in the second UE group is below a predefined threshold.

Thus, at block S1007, it may be determined whether the handover triggering condition for the second UE group fails to reach a steady state, after a predetermined number of modifying or after a predetermined period of time of modifying of the handover triggering condition for the second UE group. If No, then the process goes back to block S1010 to detect further handover failure events. If yes, at block S1008, it can be determined that a UE is misidentified in the second UE group. In other words, a high-speed UE is misidentified as in the low-speed UE group, which causes the endless loop of modifying of the handover triggering condition, i.e., the endless loop of step B and step C.

The embodiment of FIG. 10 can be considered as a combination of the optimization solution of UE identification criteria and the optimization solution of handover triggering condition. Since the handover failure events may be caused by the inappropriate handover triggering condition, or by the incorrect UE identification criteria, such embodiment can accurately judge which setting is inappropriate, the handover triggering condition or the UE identification criteria, so as to further improve the handover success rate of the communication systems.

Figure 11:
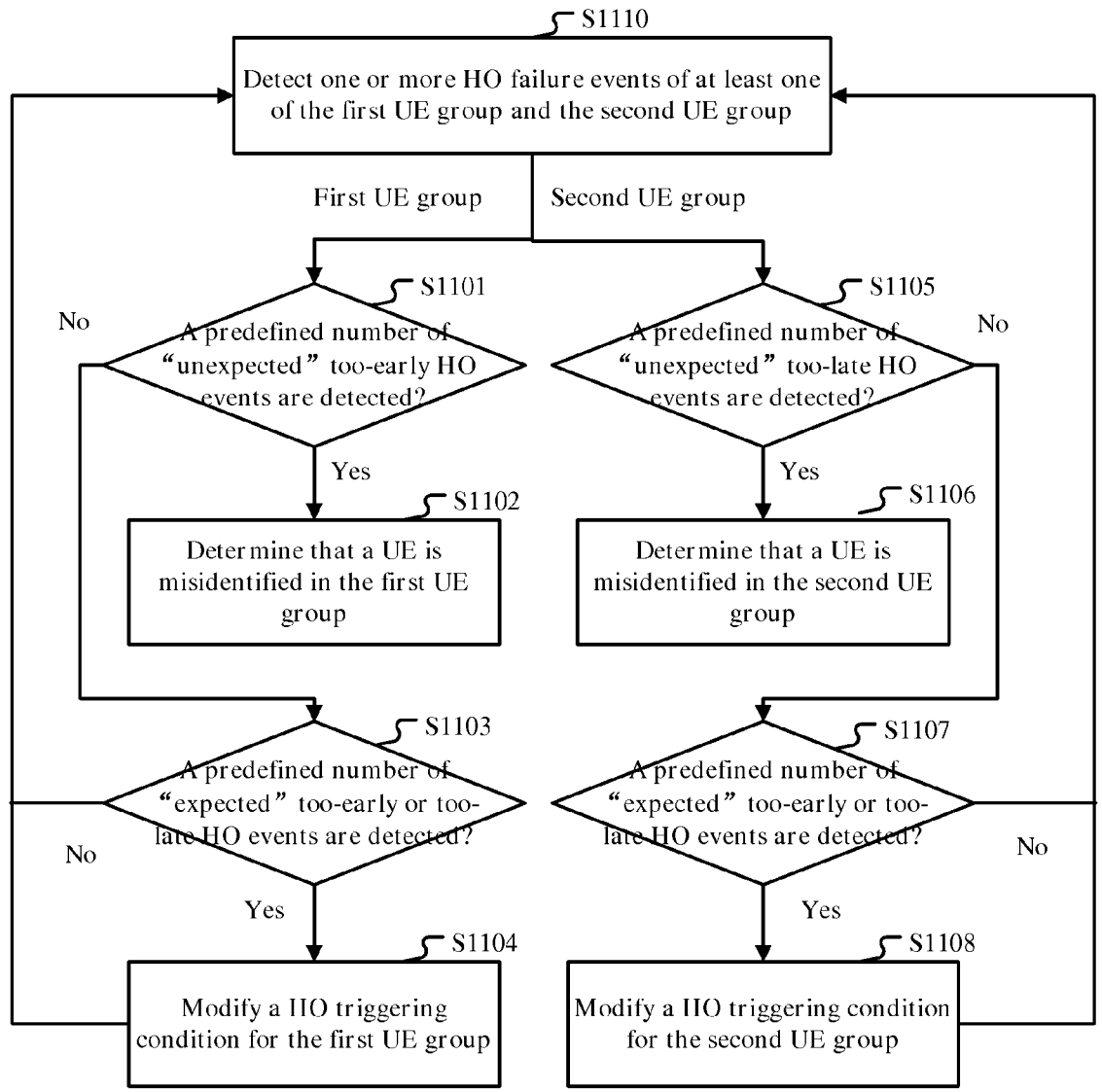
FIG. 11 illustrates an exemplary procedure for determining whether there is any UE misidentified according to yet another embodiment herein.

FIG. 11 illustrates an exemplary procedure for determining whether there is any UE misidentified according to yet another embodiment herein. Similarly, in this embodiment, the optimization of UE identification criteria and the optimization of handover triggering condition are combined, but the determining of whether there is a UE misidentified in the first UE group or the second UE group can be based on another observation.

As shown in FIG. 11, at block S1110, one or more handover failure events of at least one of the first UE group and the second UE group are detected, which is the same as block S810, S910, S1010 in FIGS. 8-10.

Then, based on the detected handover failure events of the first UE group and the second UE group, respectively, a determination of whether there is any UE misidentified in the first UE group or the second UE group can be made.

Figure 1:
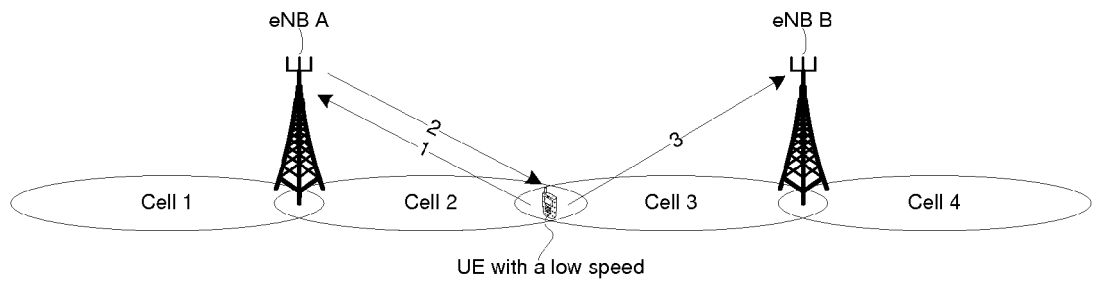
FIG. 1 illustrates a procedure for a UE to take handover between two cells in LTE systems.
Figure 2:
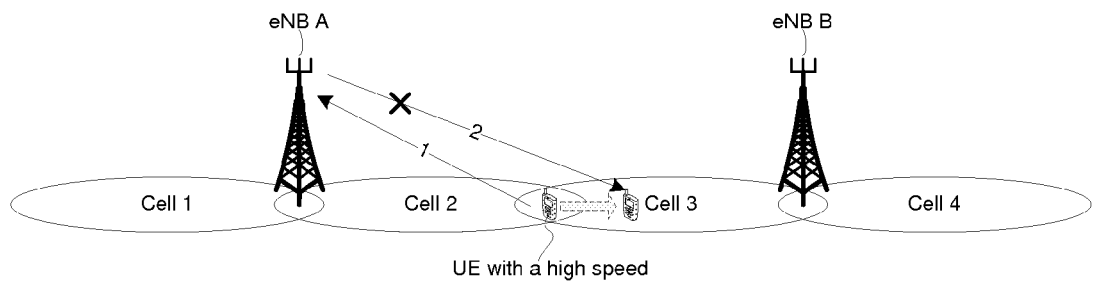
FIG. 2 illustrates an example of a too-late handover of a UE due to high-speed movement.
Figure 3:
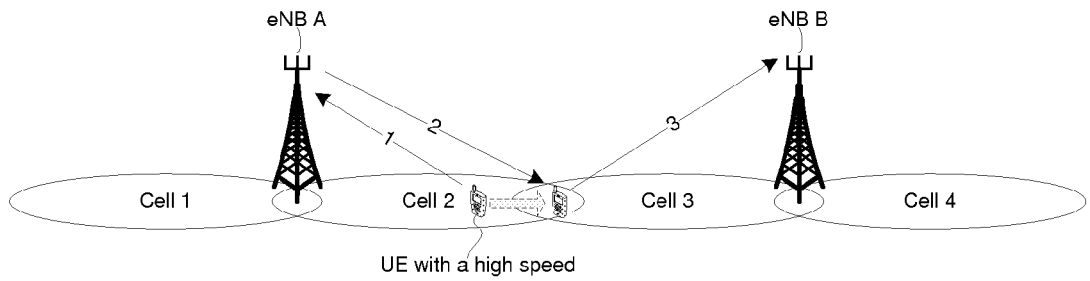
FIG. 3 illustrates an example of an advanced handover for a fast-moving UE according to the prior art.
Figure 4:
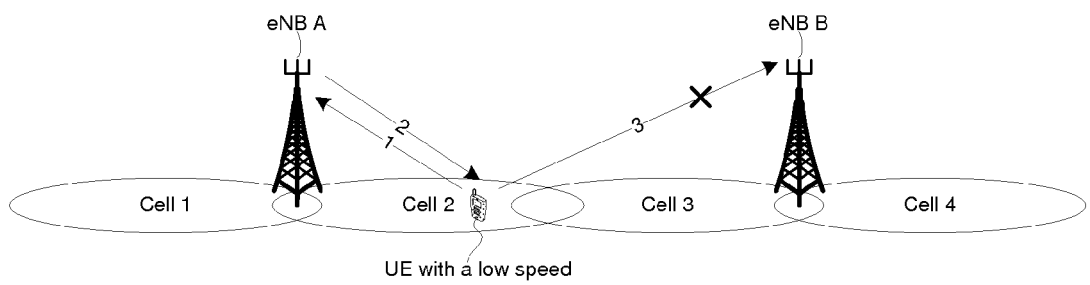
FIG. 4 illustrates an example of a too-early handover of a UE due to low-speed movement.

Normally, before a handover failure, a UE related to the handover failure event is required to report its measurement report on related cells, including the source cell, the target cell, or other neighbor cells. For example, during the first phase of handover as illustrated in FIG. 1, as indicated by the signaling line 1, a measurement report is triggered and sent from the UE to the source eNB. Besides, after a handover failure event is occurred, a UE which is in the process of re-establishment may be required to report its previous measurement report on related cells for the moment just before handover failure or radio link failure. The measurement report may comprise information about signal quality (e.g., RSRP or RSRQ) of the source cell and the target cell of the handover.

Thus, the measurement report can be used, along with the associated handover failure event, to determine whether there is any misidentified UE in the first UE group or the second UE group.

Specifically, for the first UE group, at block S1101, it may be determined whether a predefined number of too-early handover events of the first UE group are detected where a difference of signal quality between a target cell and a source cell associated with a respective too-early handover event is larger than a first threshold, e.g. during a predefined period or an evaluation period.

In some embodiments, the difference of signal quality between the target cell and the source cell can be represented as an RSRP delta, which is defined as subtracting the RSRP for the source cell from the RSRP for the target cell. If the RSRP delta is not very small, e.g., larger than the first threshold of e.g. −3 dB, it means that the target cell is appropriate for a high-speed UE to hand over from the source cell at this time. In such a case, if a predefined number of too-early handover events are detected, which are unexpected, then at block S1102, it can be deduced that a low-speed UE is misidentified as a high-speed UE in the first UE group. Please be noted that, the difference of signal quality can be represented in other forms, for example, the ratio of signal quality between the target cell and the source cell, and embodiments of the present disclosure have no limit in this regard.

Here, an "unexpected" too-early handover event means a too-early handover event occurs where the difference of signal quality between the target cell and the source cell is larger than the first threshold.

On the other hand, if the RSRP delta is very small, e.g., smaller than the first threshold of e.g. −3 dB, it means that the target cell is not appropriate for a high-speed UE in the first UE group to hand over from the source cell at this time. In such a case, if a predefined number of too-early handover events are detected, which are expected, as determined at block S1103, then at block S1104, in response to determining that a predefined number of "expected" too-early handover events of the first UE group are detected, the handover triggering condition for the first UE group can be modified, e.g., decreasing CIO_high for the first UE group. In addition, if at block S1103 it is determined that a predefined number of too-late handover events of the first UE group are detected, which could be expected because the handover triggering condition for the first UE group may be not properly set, then at block S1104, in response to determining that a predefined number of "expected" too-late handover events of the first UE group are detected, the handover triggering condition for the first UE group can be modified, e.g., increasing CIO_high for the first UE group. Thereafter, the process returns back to block S1110 to detect handover failure events continuously.

As seen from the above description, step 1 as described with reference to block S1002 in FIG. 10 could be regarded as having "expected" too-early handover events for the first UE group, because the difference of signal quality between the target cell and the source cell is very small. Step 2 as described with reference to block S1002 in FIG. 10 could be regarded as having "unexpected" too-early handover events for the first UE group, because the difference of signal quality between the target cell and the source cell is not very small. Step 3 as described with reference to block S1002 in FIG. 10 could be regarded as having "expected" too-late handover events for the first UE group, because the handover triggering condition for the first UE group may be not advanced enough.

Similarly, for the second UE group, at block S1105, it may be determined whether a predefined number of too-late handover events of the second UE group are detected where a difference of signal quality between a target cell and a source cell associated with a respective too-late handover event is smaller than a second threshold, e.g. during a predefined period or an evaluation period.

As describe above, the difference of signal quality between the target cell and the source cell can be represented as an RSRP delta. If the RSRP delta is not very large, e.g., smaller than the second threshold of e.g. 6 dB, it means that the target cell is appropriate for a low-speed UE to hand over from the source cell at this time. In such a case, if a predefined number of too-late handover events are detected, which are unexpected, then at block S1106, it can be deduced that a high-speed UE is misidentified as a low-speed UE in the second UE group.

Here, an "unexpected" too-late handover event means a too-late handover event occurs where the difference of signal quality between the target cell and the source cell is smaller than the second threshold.

On the other hand, if the RSRP delta is very large, e.g., larger than the second threshold of e.g. 6 dB, it means that the target cell is not appropriate for a low-speed UE in the second UE group to hand over from the source cell at this time. In such a case, if a predefined number of too-late handover events are detected, which are expected, as determined at block S1107, then at block S1108, in response to determining that a predefined number of "expected" too-late handover events of the second UE group are detected, the handover triggering condition for the second UE group can be modified, e.g., increasing CIO_low for the second UE group. In addition, if at block S1107 it is determined that a predefined number of too-early handover events of the second UE group are detected, which could be expected because the handover triggering condition for the second UE group may be not properly set, then at block S1108, in response to determining that a predefined number of "expected" too-early handover events of the second UE group are detected, the handover triggering condition for the second UE group can be modified, e.g., decreasing CIO_low for the first UE group. Thereafter, the process returns back to block S1110 to detect handover failure events continuously.

As seen from the above description, step A as described with reference to block S1006 in FIG. 10 could be regarded as having "expected" too-late handover events for the second UE group, because the difference of signal quality between the target cell and the source cell is very large. Step B as described with reference to block S1006 in FIG. 10 could be regarded as having "unexpected" too-late handover events for the second UE group, because the difference of signal quality between the target cell and the source cell is not very large. Step C as described with reference to block S1006 in FIG. 10 could be regarded as having "expected" too-early handover events for the second UE group, because the handover triggering condition for the second UE group may be advanced too much.

The embodiment of FIG. 11 can be considered as another combination of the optimization solution of UE identification criteria and the optimization solution of handover triggering condition. By observing the difference of signal quality between a target cell and a source cell associated with a handover failure event, a determination of whether there is any misidentified UE can be made directly and fast, without waiting the occurrence of abnormal results of modifying the handover triggering condition.

In some embodiments, the criteria of identifying a UE as in the first UE group or the second UE group can be based on Doppler Frequency-Offset Estimation, as described previously. In the Doppler FOE based identification method, a UE is identified as in the first UE group if a Doppler-FOE related parameter of the UE is higher than a third threshold (i.e., threshold A in FIG. 5), and a UE is identified as in the second UE group if the Doppler-FOE related parameter is lower than a fourth threshold (i.e., threshold B in FIG. 5)

In such embodiments, degrading or loosening the criteria of identifying a UE as in the first UE group may comprise decreasing the third threshold, upgrading or tightening the criteria of identifying a UE as in the second UE group may comprise decreasing the fourth threshold, upgrading or tightening the criteria of identifying a UE as in the first UE group may comprise increasing the third threshold, and degrading or loosening the criteria of identifying a UE as in the second UE group may comprise increasing the fourth threshold.

In some other embodiments, the criteria of identifying a UE as in the first UE group or the second UE group can be based on the method proposed in Reference 1. In the identification method in Reference 1, a UE is identified as the high speed railway UE if at least one of the following conditions is met: past M cells the UE camps on or connects to are all high speed railway cells; and past N cells the UE camps on or connects to match a predetermined camping or connecting cell list.

In such embodiments, degrading or loosening the criteria of identifying a UE as in the first UE group and upgrading or tightening the criteria of identifying a UE as in the second UE group may comprise decreasing the parameters of M and N, and upgrading or tightening the criteria of identifying a UE as in the first UE group and degrading or loosening the criteria of identifying a UE as in the second UE group may comprise increasing the parameters of M and N.

Figure 12:
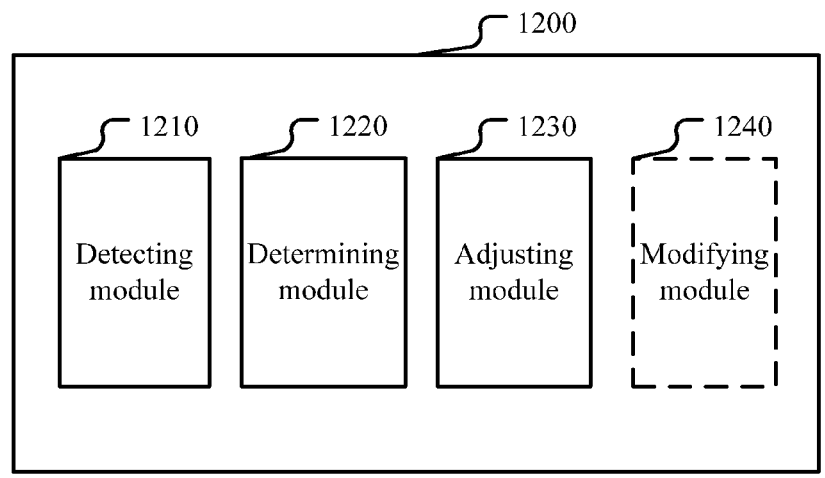
FIG. 12 illustrates a schematic block diagram of a base station that may be configured to practice the exemplary embodiments herein.

FIG. 12 illustrates a schematic block diagram of a base station 1200 that may be configured to practice the exemplary embodiments herein. The base station 1200 is configured to optimize the criteria of identifying a UE as in a first UE group or a second UE group. A speed of any UE in the first UE group is higher than a speed of any UE in the second UE group.

As shown in FIG. 12, the base station 1200 comprises a detecting module 1210, a determining module 1220, and an adjusting module 1230.

The detecting module 1210 is configured to detect one or more handover failure events of at least one of the first UE group and the second UE group.

The determining module 1220 is configured to determine whether there is any UE misidentified in the first or second UE group based on the one or more handover failure events.

The adjusting module 1230 is configured to, in response to determining that there is a UE misidentified in the first or second UE group by the determining module 1220, adjust at least one of the criteria of identifying a UE as in the first UE group and the criteria of identifying a UE as in the second UE group.

In some embodiments, the determining module 1220 may be configured to determine whether there is any UE misidentified in the first or second UE group by: in response that a predefined number of too-early handover events are detected, determining that a UE is misidentified in the first UE group; or in response that a predefined number of too-late handover events are detected, determining that a UE is misidentified in the second UE group.

In some other embodiments, the base station 1200 may further comprise a modifying module 1240. The modifying module 1240 may be configured to, in response that a predefined number of too-early or too-late handover events of the first UE group or the second UE group are detected by the detecting module 1210, modify a handover triggering condition for a respective UE group.

In such embodiments, the determining module 1220 may be configured to determine whether there is any UE misidentified in the first or second UE group by: in response that, after a predetermined number of said modifying or after a predetermined period of time of said modifying, the handover triggering condition for the first UE group or the second UE group fails to reach a steady state where the number of detected handover failure events in a respective UE group is below a predefined threshold, determining that a UE is misidentified in the respective UE group.

In some yet other embodiments, the determining module 1220 may be configured to determine whether there is any UE misidentified in the first or second UE group by: in response that a predefined number of too-early handover events of the first UE group are detected where a difference of signal quality between a target cell and a source cell associated with a respective too-early handover event is larger than a first threshold, determining that a UE is misidentified in the first UE group; or in response that a predefined number of too-late handover events of the second UE group are detected where a difference of signal quality between a target cell and a source cell associated with a respective too-late handover event is smaller than a second threshold, determining that a UE is misidentified in the second UE group.

In some further embodiments, the adjusting module 1230 can be configured to adjust at least one of the criteria of identifying a UE as in the first UE group and the criteria of identifying a UE as in the second UE group by: in response to determining that a UE is misidentified in the first UE group, upgrading the criteria of identifying a UE as in the first UE group and/or degrading the criteria of identifying a UE as in the second UE group; and in response to determining that a UE is misidentified in the second UE group, degrading the criteria of identifying a UE as in the first UE group and/or upgrading the criteria of identifying a UE as in the second UE group.

In some embodiments, the criteria of identifying a UE as in the first UE group or the second UE group can be based on Doppler Frequency-Offset Estimation, FOE. In the Doppler FOE based identification method, a UE is identified as in the first UE group if a Doppler-FOE related parameter of the UE is higher than a third threshold, and a UE is identified as in the second UE group if the Doppler-FOE related parameter is lower than a fourth threshold In such embodiments, the adjusting module 1230 may be configured to degrade the criteria of identifying a UE as in the first UE group by decreasing the third threshold, to upgrade the criteria of identifying a UE as in the second UE group by decreasing the fourth threshold, to upgrade the criteria of identifying a UE as in the first UE group by increasing the third threshold, and to degrade the criteria of identifying a UE as in the second UE group by increasing the fourth threshold.

In some other embodiments, the criteria of identifying a UE as in the first UE group or the second UE group can be based on information of UE past cells, as proposed in Reference 1. In this kind of identification method, a UE is identified as the high speed railway UE if at least one of the following conditions is met: past M cells the UE camps on or connects to are all high speed railway cells; and past N cells the UE camps on or connects to match a predetermined camping or connecting cell list.

In such embodiments, the adjusting module 1230 may be configured to degrade or loosen the criteria of identifying a UE as in the first UE group and upgrade or tighten the criteria of identifying a UE as in the second UE group by decreasing the parameters of M and N, and to upgrade or tighten the criteria of identifying a UE as in the first UE group and degrade or loosen the criteria of identifying a UE as in the second UE group by increasing the parameters of M and N.

It should be understood, the modules 1210-1240 contained in the base station 1200 are configured for practicing exemplary embodiments herein. Thus, the operations and features described above with respect to FIG. 8-11 also apply to the apparatus 1200 and the modules therein, and the detailed description thereof is omitted here.

Figure 13:
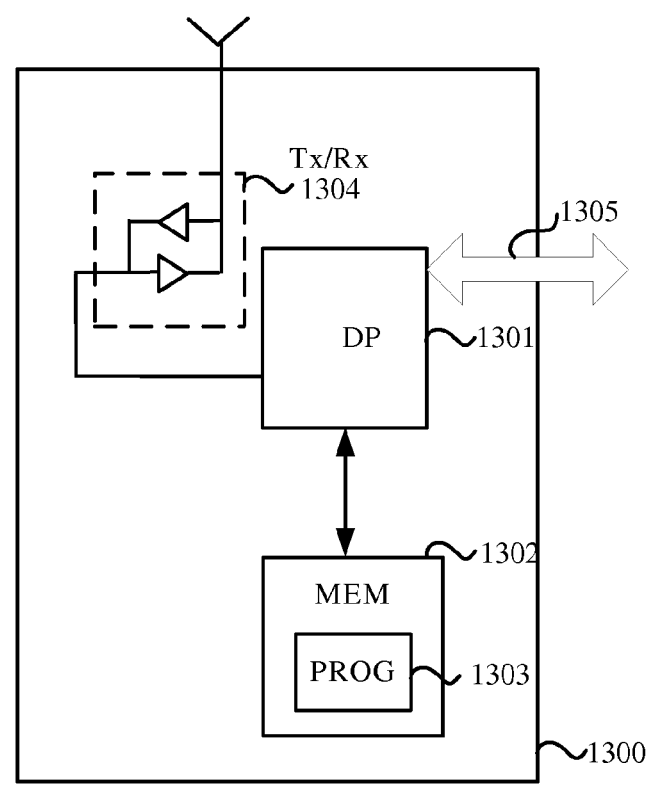
FIG. 13 illustrates a simplified block diagram of an entity that is suitable for use in practicing exemplary embodiments of the present invention.

FIG. 13 illustrates a simplified block diagram of an entity 1300 that is suitable for use in practicing exemplary embodiments of the present invention. The entity 1300 may be an entity at the network side, for example, a base station.

As shown in FIG. 13, the entity 1300 includes a data processor (DP) 1301, a memory (MEM) 1302 coupled to the DP 1301, a suitable RF transmitter TX and receiver RX 1304 coupled to the DP 1301, and a communication interface 1305 coupled to the DP 1301. The MEM 1302 stores a program (PROG) 1303. The TX/RX 1304 is for bidirectional wireless communications. Note that the TX/RX 1304 has at least one antenna to facilitate communication, though in practice a BS may have several ones. The communication interface 1305 may represent any interface that is necessary for communication with other network elements, such as X2 interface for bidirectional communications between eNB s, Si interface for communication between the MME/S-GW and the eNB, or Un interface for communication between the eNB and the RN. The entity 1300 may be coupled via a data path to one or more external networks or systems, such as the internet, for example.

The PROG 1303 is assumed to include program instructions that, when executed by the associated DP 1301, enable the entity 1300 to operate in accordance with the exemplary embodiments of this disclosure, as discussed herein with the methods in FIGS. 8-11. For example, the PROG 1303 and the DP 1301 may embody the determining unit 1220 and the adjusting module 1230 and optional modifying module 1240 to perform the respective functions. The TX/RX 1304 and the communication interface 1305 may embody the detecting module 1210 to perform the function of detecting handover failure events.

The embodiments herein may be implemented by computer software executable by the DP 1301 of the entity 1300, or by hardware, or by a combination of software and hardware.

The MEM 1302 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the entity 1300, there may be several physically distinct memory units in the entity 1300. The DP 1301 may be of any type suitable to the local technical environment, and may include one or more of general purpose computers, special purpose computers, microprocessors, digital signal processors (DSPs) and processors based on multicore processor architecture, as non limiting examples. The entity 1300 may have multiple processors, such as for example an application specific integrated circuit chip that is slaved in time to a clock which synchronizes the main processor.

Exemplary embodiments herein have been described above with reference to block diagrams and flowchart illustrations of methods, apparatuses (i.e., systems). It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

The foregoing computer program instructions can be, for example, sub-routines and/or functions. A computer program product in one embodiment comprises at least one computer readable storage medium, on which the foregoing computer program instructions are stored. The computer readable storage medium can be, for example, an optical compact disk or an electronic memory device like a RAM (random access memory) or a ROM (read only memory).

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It should also be noted that the above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims. In addition, any of the reference numerals in the claims should not be interpreted as a limitation to the claims. Use of the verb "comprise" and its conjugations does not exclude the presence of elements or steps other than those stated in a claim. The indefinite article "a" or "an" preceding an element or step does not exclude the presence of a plurality of such elements or steps.

What is claimed is:

1. A method in a base station, BS, of a cellular radio system for optimizing criteria of identifying a user equipment, UE, as in a first UE group or a second UE group, wherein a speed of any UE in the first UE group is higher than a speed of any UE in the second UE group, the method comprising:
   detecting one or more handover failure events of at least one of the first UE group and the second UE group;
   determining whether there is any UE misidentified in the first or second UE group based on the one or more handover failure events; and
   in response to determining that there is a UE misidentified in the first or second UE group, adjusting at least one of the criteria of identifying a UE as in the first UE group and the criteria of identifying a UE as in the second UE group.

2. The method of claim 1, wherein after said detecting, the method further comprises:
   in response that a predefined number of too-early or too-late handover events of the first UE group or the second UE group are detected, modifying a handover triggering condition for a respective UE group; and
   wherein said determining comprises:
   in response that, after a predetermined number of said modifying or after a predetermined period of time of said modifying, the handover triggering condition for the first UE group or the second UE group fails to reach a steady state where the number of detected handover failure events in a respective UE group is below a predefined threshold, determining that a UE is misidentified in the respective UE group.

3. The method of claim 2, wherein said adjusting comprises:
   in response to determining that a UE is misidentified in the first UE group, upgrading the criteria of identifying a UE as in the first UE group and/or degrading the criteria of identifying a UE as in the second UE group; or
   in response to determining that a UE is misidentified in the second UE group, degrading the criteria of identifying a UE as in the first UE group and/or upgrading the criteria of identifying a UE as in the second UE group.

4. The method of claim 3, wherein the criteria of identifying a UE as in the first UE group or the second UE group are based on Doppler Frequency-Offset Estimation, FOE, wherein a UE is identified as in the first UE group if a Doppler-FOE related parameter of the UE is higher than a third threshold, and a UE is identified as in the second UE group if the Doppler-FOE related parameter is lower than a fourth threshold; and
   wherein said degrading the criteria of identifying a UE as in the first UE group comprises decreasing the third threshold, said upgrading the criteria of identifying a UE as in the second UE group comprises decreasing the fourth threshold, said upgrading the criteria of identifying a UE as in the first UE group comprises increasing the third threshold, and said degrading the criteria of identifying a UE as in the second UE group comprises increasing the fourth threshold.

5. The method of claim 1, wherein said determining comprises:
   in response that a predefined number of too-early handover events of the first UE group are detected where a difference of signal quality between a target cell and a source cell associated with a respective too-early handover event is larger than a first threshold, determining that a UE is misidentified in the first UE group; or
   in response that a predefined number of too-late handover events of the second UE group are detected where a difference of signal quality between a target cell and a source cell associated with a respective too-late handover event is smaller than a second threshold, determining that a UE is misidentified in the second UE group.

6. The method of claim 1, wherein said determining comprises:
   in response that a predefined number of too-early handover events are detected, determining that a UE is misidentified in the first UE group; or
   in response that a predefined number of too-late handover events are detected, determining that a UE is misidentified in the second UE group.

7. A base station, BS, of a cellular radio system for optimizing criteria of identifying a user equipment, UE, as in a first UE group or a second UE group, wherein a speed of any UE in the first UE group is higher than a speed of any UE in the second UE group, the base station comprising:
   a detecting module, configured to detect one or more handover failure events of at least one of the first UE group and the second UE group;
   a determining module, configured to determine whether there is any UE misidentified in the first or second UE group based on the one or more handover failure events; and
   an adjusting module, configured to, in response to determining that there is a UE misidentified in the first or second UE group, adjust at least one of the criteria of identifying a UE as in the first UE group and the criteria of identifying a UE as in the second UE group.

8. The base station of claim 7, wherein the base station further comprises:
   a modifying module, configured to, in response that a predefined number of too-early or too-late handover events of the first UE group or the second UE group are detected, modify a handover triggering condition for a respective UE group; and
   wherein said determining module is configured to determine whether there is any UE misidentified in the first or second UE group by:
   in response that, after a predetermined number of said modifying or after a predetermined period of time of said modifying, the handover triggering condition for the first UE group or the second UE group fails to reach a steady state where the number of detected handover failure events in a respective UE group is below a predefined threshold, determining that a UE is misidentified in the respective UE group.

9. The base station of claim 8, wherein said adjusting module is configured to adjust at least one of the criteria of identifying a UE as in the first UE group and the criteria of identifying a UE as in the second UE group by:
   in response to determining that a UE is misidentified in the first UE group, upgrading the criteria of identifying a UE as in the first UE group and/or degrading the criteria of identifying a UE as in the second UE group; and
   in response to determining that a UE is misidentified in the second UE group, degrading the criteria of identifying a UE as in the first UE group and/or upgrading the criteria of identifying a UE as in the second UE group.

10. The base station of claim 9, wherein the criteria of identifying a UE as in the first UE group or the second UE group are based on Doppler Frequency-Offset Estimation, FOE, wherein a UE is identified as in the first UE group if a Doppler-FOE related parameter of the UE is higher than a third threshold, and a UE is identified as in the second UE group if the Doppler-FOE related parameter is lower than a fourth threshold; and wherein said adjusting module is configured to degrade the criteria of identifying a UE as in the first UE group by decreasing the third threshold, to upgrade the criteria of identifying a UE as in the second UE group by decreasing the fourth threshold, to upgrade the criteria of identifying a UE as in the first UE group by increasing the third threshold, and to degrade the criteria of identifying a UE as in the second UE group by increasing the fourth threshold.

11. The base station of claim 7, wherein said determining module is configured to determine whether there is any UE misidentified in the first or second UE group by:

in response that a predefined number of too-early handover events of the first UE group are detected where a difference of signal quality between a target cell and a source cell associated with a respective too-early handover event is larger than a first threshold, determining that a UE is misidentified in the first UE group; or in response that a predefined number of too-late handover events of the second UE group are detected where a difference of signal quality between a target cell and a source cell associated with a respective too-late handover event is smaller than a second threshold, determining that a UE is misidentified in the second UE group.

12. The base station of claim 7, wherein said determining module is configured to determine whether there is any UE misidentified in the first or second UE group by:

in response that a predefined number of too-early handover events are detected, determining that a UE is misidentified in the first UE group; or in response that a predefined number of too-late handover events are detected, determining that a UE is misidentified in the second UE group.

13. A base station, BS, of a cellular radio system adapted for optimizing criteria of identifying a user equipment, UE, as in a first UE group or a second UE group, wherein a speed of any UE in the first UE group is higher than a speed of any UE in the second UE group, the base station comprising:

a processor; and a memory, said memory containing instructions executable by said processor, whereby said base station is operative to:

detect one or more handover failure events of at least one of the first UE group and the second UE group;

determine whether there is any UE misidentified in the first or second UE group based on the one or more handover failure events; and in response to determining that there is a UE misidentified in the first or second UE group, adjust at least one of the criteria of identifying a UE as in the first UE group and the criteria of identifying a UE as in the second UE group.

14. The base station of claim 13, wherein the base station is further operative to:

in response that a predefined number of too-early or too-late handover events of the first UE group or the second UE group are detected, modify a handover triggering condition for a respective UE group; and wherein the base station is further operative to determine whether there is any UE misidentified in the first or second UE group by:

in response that, after a predetermined number of said modifying or after a predetermined period of time of said modifying, the handover triggering condition for the first UE group or the second UE group fails to reach a steady state where the number of detected handover failure events in a respective UE group is below a predefined threshold, determining that a UE is misidentified in the respective UE group.

15. The base station of claim 14, wherein said base station is further operative to adjust at least one of the criteria of identifying a UE as in the first UE group and the criteria of identifying a UE as in the second UE group by:

in response to determining that a UE is misidentified in the first UE group, upgrading the criteria of identifying a UE as in the first UE group and/or degrading the criteria of identifying a UE as in the second UE group; and in response to determining that a UE is misidentified in the second UE group, degrading the criteria of identifying a UE as in the first UE group and/or upgrading the criteria of identifying a UE as in the second UE group.

16. The base station of claim 15, wherein the criteria of identifying a UE as in the first UE group or the second UE group are based on Doppler Frequency-Offset Estimation, FOE, wherein a UE is identified as in the first UE group if a Doppler-FOE related parameter of the UE is higher than a third threshold, and a UE is identified as in the second UE group if the Doppler-FOE related parameter is lower than a fourth threshold; and wherein said base station is further configured to degrade the criteria of identifying a UE as in the first UE group by decreasing the third threshold, to upgrade the criteria of identifying a UE as in the second UE group by decreasing the fourth threshold, to upgrade the criteria of identifying a UE as in the first UE group by increasing the third threshold, and to degrade the criteria of identifying a UE as in the second UE group by increasing the fourth threshold.

17. The base station of claim 13, wherein said base station is further operative to determine whether there is any UE misidentified in the first or second UE group by:

in response that a predefined number of too-early handover events of the first UE group are detected where a difference of signal quality between a target cell and a source cell associated with a respective too-early handover event is larger than a first threshold, determining that a UE is misidentified in the first UE group; or in response that a predefined number of too-late handover events of the second UE group are detected where a difference of signal quality between a target cell and a source cell associated with a respective too-late handover event is smaller than a second threshold, determining that a UE is misidentified in the second UE group.

18. The base station of claim 13, wherein said base station is further operative to determine whether there is any UE misidentified in the first or second UE group by:

in response that a predefined number of too-early handover events are detected, determining that a UE is misidentified in the first UE group; or in response that a predefined number of too-late handover events are detected, determining that a UE is misidentified in the second UE group.

19. A base station, BS, of a cellular radio system adapted for optimizing criteria of identifying a user equipment, UE, as in a first UE group or a second UE group, wherein a speed of any UE in the first UE group is higher than a speed of any UE in the second UE group, the base station comprising:
processing means adapted to:
  detect one or more handover failure events of at least one of the first UE group and the second UE group;
  determine whether there is any UE misidentified in the first or second UE group based on the one or more handover failure events; and
  in response to determining that there is a UE misidentified in the first or second UE group, adjust at least one of the criteria of identifying a UE as in the first UE group and the criteria of identifying a UE as in the second UE group.

* * * * *